Sept. 21, 1926.
J. HOFMANN
SHOCK ABSORBER
Filed Feb. 6, 1923
1,600,544
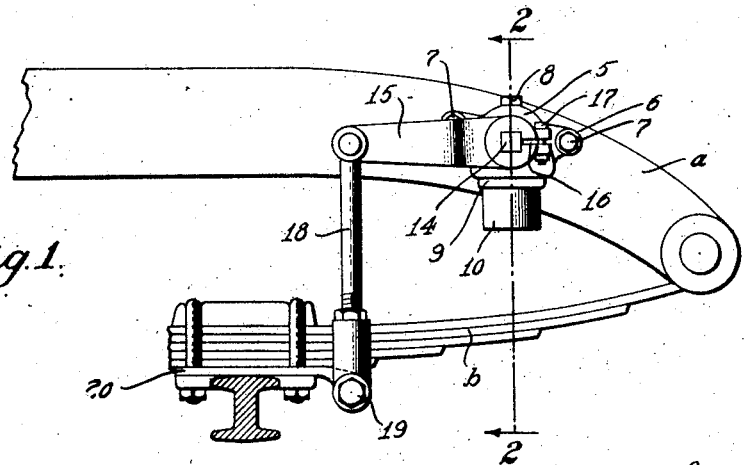
Fig.1.
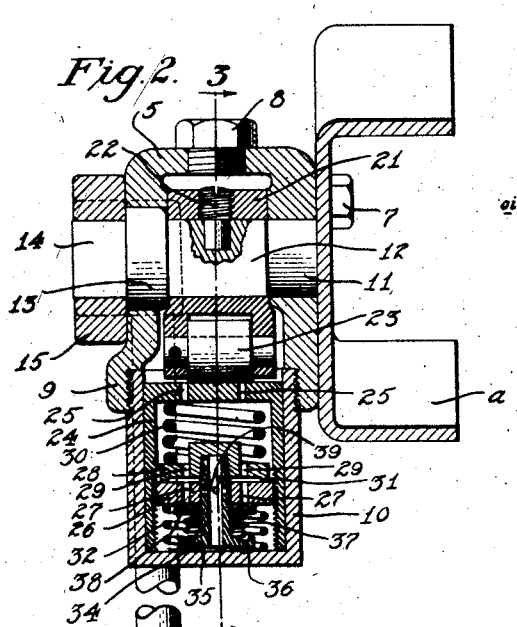
Fig.2.
Fig.3.
Fig.4.
Inventor
Josef Hofmann
By Henry Orth
Attorney Patented Sept. 21, 1926.

1,600,544

UNITED STATES PATENT OFFICE.

JOSEF HOFMANN, OF BAUMAROCHE, SWITZERLAND.

SHOCK ABSORBER.

Application filed February 6, 1923. Serial No. 617,303.

My invention relates to shock absorbers of the hydraulic type, in which the body spring is free to operate from its normal position but which will retard the movement of the spring back into its normal position.

Specifically, the invention includes the action of a cam on a piston-like member normally urged against said cam by a spring when the cam is moving from the piston. The return of the cam to normal position is retarded, either directly or indirectly, by the spring.

Whatever the construction and assemblage of these parts, there shall be an actuating member moving a power member and angularly displaced therefrom, and a braking mechanism arranged with respect to the power mechanism for free movement in one direction and for resistance to movement in the other direction which is effective at all speeds.

In operation, such an arrangement causes the actuating member to operate the power member to move the braking member with a varying amplitude, and upon the return of the parts to normal position converts the constant resistance of the braking member into a decreasing resistance which is effective at all speeds.

Referring to the drawings, in which like parts are similarly designated—

Figure 1 is a side elevation of my shock absorber attached to a motor vehicle.

Fig. 2 is a vertical section on line 2—2, Fig. 1.

Fig. 3 is a section on line 3—3, Fig. 2.

Fig. 4 is a transverse section on line 4—4 Fig. 3.

My shock absorber, as shown in Figs. 1–4, comprises a body member or casting 5, substantially flat on one side for the purpose of securing it against the body frame extension $a$ of the vehicle. For the purpose of so fastening this member, it is provided with two eyes 6, through which pass the securing bolts 7.

This body member is hollow, has a threaded filling opening at the top, closed by a screw 8, and at the bottom is cylindrical at 9 and threaded for receiving and holding a cylinder 10.

Passing through the body member is a shaft having a cylindrical small end 11, a middle square portion 12, a larger cylindrical bearing portion 13 and a square outer end 14, the latter for the reception of an actuating lever 15.

This lever 15 is preferably split at its end, as at 16, and a tightening bolt 17 passed through the split end. The lever 15 is connected by a rod 18, whose length is adjustable to accommodate different dimensions of vehicles, to a running gear element of the vehicle. The lower end of this rod is pivoted at 19 for connection to a running gear member, here shown as a plate 20 lying beneath the body spring $b$ of the vehicle.

Within the body member 5 on the square portion 12 of the shaft I mount a power member or cam 21 having a grub screw 22 smaller than the screw 8, so that it can be inserted through the filling opening. The cam is preferably provided with an antifriction roller 23. This roller, or the cam proper, if the roller is omitted, rests on the closed end of a hollow piston 24 fitting the cylinder 10 that is provided through the closed end with passages 25. The piston is open at its opposite end, which is interiorly threaded for the reception of a partition 26, also provided with ports 27.

This partition divides the assemblage of body member and cylinder into two fluid chambers one above and the other below it, which chambers vary in capacity in accordance with the vertical position of the partition and piston.

Resting on top of this partition is a plate 28 provided with ports 29, and this plate is held seated on the partition by a heavy spring 30. A bead 31 on the lower face of the plate 28 prevents this plate from sticking to the partition or closing the ports 27 and 29.

Beneath the partition is a spring 32 lighter than spring 30, and whose function is to urge the hollow perforated piston toward the cam 21.

The plate 28 has a tubular stem 34 passing through the partition 26 and terminating below the partition in a flange 35 provided with a retaining groove 36 for a light spring 37 that supports a one way valve 38 against the under face of the partition and closes the ports 27. This valve controls the passage of liquid from the chamber above the partition to the chamber below it.

The hollow steam 34 is provided with holes 39 that are controlled by the partition 26 through which the tubular valve 34 slides, and constitutes a throttling valve controlling the passage of liquid from the chamber below the partition to the chamber above it.

The operation is as follows:

When the vehicle spring b is stressed, either by the vehicle spring and axle being raised or lowered from normal position by reason of shock, or ruts in the road, or when the vehicle body suddenly rises or lowers with respect to the vehicle axle, rod 18 is moved to move lever 15 and cause relative rotation of cam 21 and body member 5; that is to say, the cam 21 and its roller 23 are displaced to one side or the other of the position shown in Fig. 3.

This permits the hollow piston 24 to rise in maintained contact with the cam under the influence of its spring 32. Oil will then be freely displaced from the body member 5, through holes 25 to the interior of the piston, thence through holes 29 in plate 28 and holes 27 in partition 26 past the valve 38, which is urged to close the holes 27 by only a very light spring 37, into the space below the partition 26. The various holes above-mentioned are numerous and large enough to enable a ready and easy displacement of the fluid, as above described.

Now, upon the return, or rebound as it is called, of the vehicle parts to normal position, the cam 21 is rotated back to normal position, Fig. 3, and in so doing the hollow piston 24 is depressed, valve 38 is closed and held closed by the pressure of the oil beneath it, and the only path for the oil between chamber below the partition 26 and the chamber above it and the piston is through tubular stem or throttle valve 34 which is raised by the pressure of the oil in said stem at its upper end on the plate 28. This plate is under the pressure of the strong spring 30, and by reason of the small cross-sectional area of tube 34 there must be a considerable pressure to lift the plate 28 as it rises with tube 24 to open more or less the openings or ports 39 that throttle the passage of oil therethrough to the space above the partition.

Oil after passing through the valve ports 39 is free to pass around the plate and through the plate holes 29 into the space within the piston above the partition 26 and thence through the holes 25 in the top of the piston into the body member 5.

In this manner the return movement or rebound is efficiently checked and slowed down, excessive oscillations of the car body are prevented, and the oscillating parts are quickly returned to normal position, by reason of the decreasing resistance due to the rate of change of the effective leverage of the power member (cam) and the actuating lever in relation to the movement of the liquid throttling members, which relation is a decreasing ratio.

It will be noted that the partition 26 is in threaded connection with the piston, by reason of which it may be adjusted up or down to vary the pressure of the heavy spring 30 that controls the tubular valve 34, and thus the shock absorber may be adjusted for normal loads of cars of different types or makes.

I claim:—

1. A shock absorber having an actuating member and a power member angularly displaced from one another, a braking member having free movement in one direction when said power member is moved in either direction from normal positions, means to produce a constant resistance to movement in the other direction and effective at all speeds, and a device to transmit the movement of the power member upon said mechanism with varying amplitude and convert the constant resistance of said means into a decreasing resistance effective at all speeds upon movement of the parts to normal position.

2. In a hydraulic shock absorber, a cylinder, a hollow piston therein vented into the cylinder, a partition stationary in the piston having one way free flow valve-controlled openings, a throttle valve controlling flow to the opposite side of said partition, a spring between said piston and valve and means to operate said piston.

3. In a hydraulic shock absorber, a cylinder, a hollow piston therein, means to operate the piston in one direction, separate means to operate the piston in the opposite direction, said piston having communication at both of its ends with said cylinder, a partition stationary in said piston one-way free-flow valve-controlled passages from one side of said partition to the other, a throttle valve controlling reverse flow from one side of said partition to the other and a spring retarding the movement of said throttle valve.

4. In a hydraulic shock absorber, a cylinder, a hollow piston therein, means to operate the piston in one direction, separate means to operate the piston in an opposite direction, the interior of said piston having maintained communication with both ends of said cylinder, a partition in the piston having one-way free-flow valve-controlled passages from one side to the other, a throttle valve controlling the flow of liquid in the opposite direction past said partition, and a spring controlling said valve, said partition being adjustable to adjust the tension of said spring.

5. In a hydraulic shock absorber, a cylinder, a hollow piston therein having maintained communication at both ends with said cylinder, a cam to operate the piston in one direction, a spring to operate said piston in the opposite direction, a partition in said piston having ports therethrough, a spring-urged valve beneath said partition controlling said ports, a ported plate above said partition, a tubular valve connected to said plate and movable therewith and a spring between said plate and one end of said piston.

6. In a hydraulic shock absorber, a cylinder, a hollow piston, a ported partition stationarily mounted therein dividing the piston and cylinder into two chambers and movable with said piston, a spring-closed valve controlling the flow one-way from one chamber to the other, a valve controlling the passage of liquid in an opposite direction, a spring loading said valve and bodily movable with said piston, means arranged for connection to a vehicle member to move said piston in one direction and a spring to move said piston in an opposite direction.

7. In a hydraulic shock absorber, a cylinder, a hollow piston therein, a ported partition in the piston dividing the piston and cylinder into two chambers, a spring-closed valve controlling the flow one way from one chamber to the other, a valve controlling the flow of liquid in an opposite direction, a spring loading the latter valve, a rocking cam operated from a movable member of the vehicle to move said piston in one direction and a spring to urge the piston toward said cam.

8. In a hydraulic shock absorber, a main cylinder, a hollow piston therein consisting of a cylinder having a hood at one end and vented therethrough to the main cylinder and open at the other end, a partition stationary in the hollow piston having one-way, free-flow openings therethrough, a throttle valve controlling flow through said openings to the opposite side of said partition, a spring between said piston and valve and a cam device operating on the piston head to allow movement of the piston when said device is moved in either direction from its normal position.

9. In a hydraulic shock absorber, a main cylinder, a hollow piston therein consisting of a cylinder having a hood at one end and vented therethrough to the main cylinder and open at the other end, a partition stationary in the hollow piston having one-way, free-flow openings therethrough, means to adjust the partition, a throttle valve controlling flow through said openings to the opposite side of said partition, a spring between said piston and valve and a cam device operating on the piston head to allow movement of the piston when said device is moved in either direction from its normal position.

In testimony that I claim the foregoings as my invention, I have signed my name hereto.

JOSEF HOFMANN.